(12) United States Patent
Amara et al.

(10) Patent No.: US 8,989,119 B2
(45) Date of Patent: Mar. 24, 2015

(54) METHOD OF TRANSMITTING A SIGNAL FOR A MULTI-USER MIMO SYSTEM, AND CORRESPONDING TRANSMITTER, COMPUTER PROGRAM PRODUCT, AND DATA MEDIUM

(75) Inventors: Mustapha Amara, Sousse (TN); Julie Yuan-Wu, Versailles (FR); Dirk Slock, Vallauris (FR)

(73) Assignee: Orange, Paris (FR)

( * ) Notice: Subject to any disclaimer, the term of this patent is extended or adjusted under 35 U.S.C. 154(b) by 240 days.

(21) Appl. No.: 13/635,626

(22) PCT Filed: Mar. 14, 2011

(86) PCT No.: PCT/FR2011/050503
§ 371 (c)(1),
(2), (4) Date: Feb. 12, 2013

(87) PCT Pub. No.: WO2011/114047
PCT Pub. Date: Sep. 22, 2011

(65) Prior Publication Data
US 2013/0142131 A1    Jun. 6, 2013

(30) Foreign Application Priority Data

Mar. 15, 2010  (FR) ...................................... 10 51830

(51) Int. Cl.
*H04W 4/00*     (2009.01)
*H04H 20/71*    (2008.01)
(Continued)

(52) U.S. Cl.
CPC ........... *H04W 72/005* (2013.01); *H04B 7/0452* (2013.01)
USPC .......................................... 370/329; 370/312

(58) Field of Classification Search
CPC ........................... H04B 7/0452; H04B 7/0456
See application file for complete search history.

(56) References Cited

U.S. PATENT DOCUMENTS 8,059,733 B2 * 11/2011 Khojastepour et al. ....... 375/260
2008/0159425 A1   7/2008 Khojastepour et al.

OTHER PUBLICATIONS

Yongle Wu, Jinfan Zhang, Mingguang Xu, Shidong Zhou and Xibin Xu, "Multiuser MIMO Downlink Precoder Design Based on the Maximal SJNR Criterion", IEEE Globecom 2005 proceedings, pp. 2694 2698.

(Continued)

*Primary Examiner* — Afshawn Towfighi
(74) *Attorney, Agent, or Firm* — David D. Brush; Westman,Champlin & Koehler, P.A.

(57) ABSTRACT

A method and apparatus for simultaneously transmitting K data streams allocated respectively to K different users. The method is implemented by a transmitter for a multi-user MIMO system having $N_T$ transmit antennas and $$N_R = \sum_{k=1}^{K} N_{R_k}$$

receive antennas associated with K receivers, each associated with a respective user. The method includes, per data stream, at least: jointly calculating a linear pre-coder and a receiver adapted for a multi-user MIMO system using two different iterative algorithms in succession, wherein the second iterative algorithm is initialized with the output value from the first iterative algorithm.

13 Claims, 5 Drawing Sheets

(51) Int. Cl.
*H04W 72/00* (2009.01)
*H04B 7/04* (2006.01)

(56) References Cited

OTHER PUBLICATIONS

International Preliminary Report on Patentability and English translation of the Written Opinion dated Sep. 18, 2012, for corresponding International Application No. PCT/FR2011/050503, filed Mar. 14, 2011.
M. Costa, "Writing on Dirty Paper", IEEE Trans. Inf. Theory, vol. 29, No. 3, pp. 439 441, May 1983.
G. Caire and S. Shamai, "On the achievable throughput of a multiantenna Gaussian broadcast channel", IEEE Trans. Inform. Theory, vol. 49, No. 7, pp. 1691 1706, Jul. 2003.
M. Lee and S.K. Oh, "A Per-User Successive MMSE Precoding Technique in Multiuser MIMO Systems", IEEE Vehicular Technology Conference (VTC2007-Spring), pp. 2374 2378, Apr. 22 25, 2007.
International Search Report and Written Opinion dated Jul. 12, 2011 for corresponding International Application No. PCT/FR2011/050503, filed Mar. 14, 2011.
Mustapha Amara et al., "Receiver and Transmitter Iterative Optimization Using Maximum Sum-Rate Criterion for Multi-User MIMO Systems" Communications, Control and Signal Processing (ISCCSP), 2010 4th International Symposium on, IEEE, Piscataway, NJ, USA, Mar. 3, 2010, pp. 1-6, XP031675687.
Hongmei Wang et al., "PHY 13-4—Robust Transmission for Multiuser MIMO Downlink Systems with Imperfect CSIT", Wireless Communications and Networking Conference, 2008, WCNC 2008. IEEE, IEEE, Piscataway, NJ, USA, Mar. 31, 2008, pp. 340-344, XP031243650.
Jinfan Zhang et al., "Joint Linear Transmitter and Receiver Design for the Downlink of Multiuser MIMO Systems", IEEE Communications Letters, IEEE Service Center, Piscataway, NJ, USA, vol. 9, No. 11, Nov. 1, 2005, pp. 991-993, XP001512789.
Mustapha Amara et al., "Optimized Linear Receivers and Power Allocation for Two Multi-User MIMO Downlink Schemes with Linear Precoding" Communications, Control and Signal Processing (ISCCSP), 2010 4th International Symposium on, IEEE, Piscataway, NJ, USA, Mar. 3, 2010, pp. 1-5, XP031675686.
Kyungho Park et al., "Adaptive Stack-Based Interative Precoding for the Multiuser MIMO Downlink" Personal, Indoor and Mobile Radio Communications, 2008. PIMRC 2008, IEEE 19th International Symposium on, IEEE, Piscataway, NJ, USA, Sep. 15, 2008, pp. 1-5, XP031371323.
French Search Report and Written Opinion dated Jan. 25, 2011 for corresponding French Application No. 1051830, filed Mar. 15, 2010.
English translation of the Written Opinion dated Jul. 12, 2011 for corresponding International Application No. PCT/FR2011/050503, filed Mar. 14, 2011.
Mihailo Stojnic, Haris Vikalo and Babak Hassibi, "Rate Maximization in Multi-Antenna Broadcast Chnnels with Linear Preprocessing", IEEE Communications Society, Globecom 2004, pp. 3957-3961.

\* cited by examiner

METHOD OF TRANSMITTING A SIGNAL FOR A MULTI-USER MIMO SYSTEM, AND CORRESPONDING TRANSMITTER, COMPUTER PROGRAM PRODUCT, AND DATA MEDIUM

CROSS-REFERENCE TO RELATED APPLICATIONS

This Application is a Section 371 National Stage Application of International Application No. PCT/FR2011/050503, filed Mar. 14, 2011, which is incorporated by reference in its entirety and published as WO 2011/114047 on Sep. 22, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of telecommunications. Within this field, the disclosure relates more particularly to so-called "digital" communications. Digital communications include in particular wireless communications; they also include communications by wire, for example. The communications transmission medium is commonly referred to as a transmission channel or a propagation channel, originally with reference to a channel over the air and by extension with reference to any channel.

The disclosure relates to transmission and reception techniques in a multi-antenna multi-stream system with at least one stream per user. It applies essentially to down-link communications, and more particularly to communications from a base station to a plurality of terminals. Under such circumstances, the transmission channel is referred to as a "broadcast" channel.

BACKGROUND OF THE DISCLOSURE

Multi-antenna digital communications systems are commonly referred to as multiple input multiple output (MIMO) systems and they cover all systems that include a plurality of transmit antennas and generally a plurality of receive antennas. A MIMO system having only a single receive antenna is also referred to as a multiple input single output (MISO) system.

Such systems satisfy the ever-increasing demand for the supply of a variety of telecommunications services at data rates that are always greater than those presently available. It has been proved that the capacity of MIMO channels increases in proportion with the minimum numbers of transmit and receive antennas.

Figure 1:
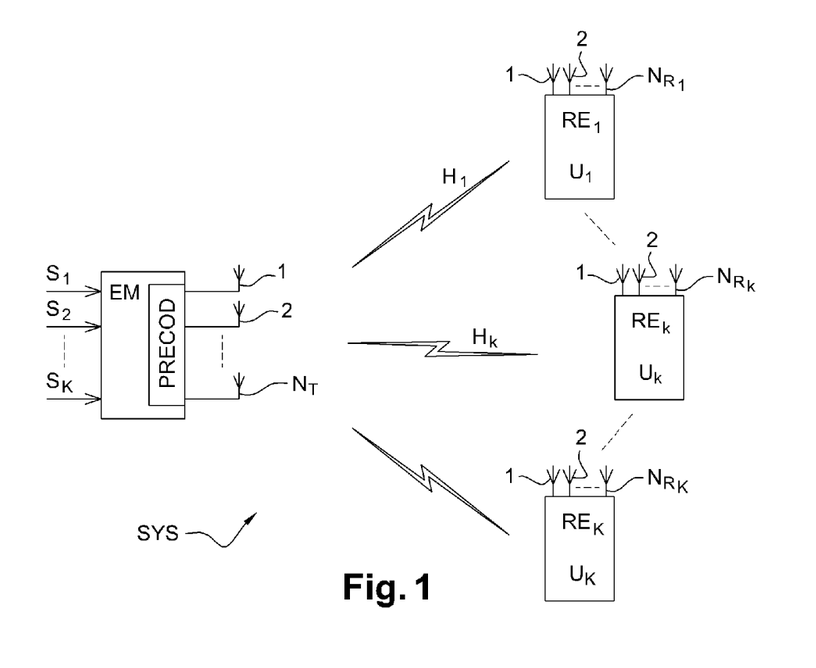
FIG. 1 is a diagram of a multi-user linear MIMO system of the prior art.

An example of such a system is shown in the diagram of FIG. 1. The system comprises a base station with $N_T$ transmit antennas and K mobile stations (referred to simply as "mobiles" below) with $N_{R_k}$ receive antennas for the user k associated with the mobile k. The transmission channel for the user k is modeled by a matrix $H_k$ of size $N_{R_k} \times N_T$ that represents the impact of the transmission channel between the transmit antennas and the receive antennas. Each component of the matrix is a random variable of zero average value and of variance that is considered to be equal to 1.

An embodiment of the invention lies in the context of a channel with slow Rayleigh fading per user and with total independence between the various channels for the various users. This makes it possible to consider that for each data stream associated with a user, the propagation channel of the stream is independent of the propagation channels of the other streams. The context of a channel with slow Rayleigh fading per user and with total independence between the various channels of the various users typically corresponds to propagation in an urban area, i.e. with multiple path propagation.

With a multi-user MIMO system, the streams for the various users are transmitted simultaneously from the base station to the receivers of the users.

An embodiment of the invention lies in a context of broadcasting in the information theory meaning, i.e. in a context of different streams for different users being transmitted from a single transmitter. Furthermore, the transmitter has perfect knowledge of the transmission channel. This implies a perfect estimate of all of the components of the matrices $H_k$ of all of the users, since the channel is a broadcast channel, and also the transmission channel does not vary between the moment when an estimate of the channel is made on reception and the moment when said estimate is used on transmission.

At the transmission end, pre-coders serve to separate the streams of the various users so as to minimize inter-user interference on reception and consequently improve the data rate conveyed. A data stream is associated with a user. The streams of the various users may relate to telecommunications services that are the same and/or different (e.g. voice, data, video).

Although the maximum number of streams per user is $Q_k = \min(N_{R_k}, T_k)$, the present description is limited to one stream per user for simplification purposes.

The total maximum data rate that can be conveyed by a MIMO system to all of the users is a very important quantity that serves for dimensioning the system. This quantity is defined by information theory as the ergodic capacity of the system.

Optimization of the total data rate is based on simultaneously optimizing the transmitter and the receiver in order to find the combination that minimizes mean square error (MSE).

Known techniques for multi-user MIMO systems are based on criteria such as minimum mean square error (MMSE) and signal to jamming and noise ratio (SJNR) that enable the system to be optimized.

Certain theoretical analyses have shown that the capacity of the multi-user MIMO (MU-MIMO) broadcast channel can be reached using the dirty paper coding (DPC) algorithm [3,4]. Nevertheless, in spite of great advances in computers, DPC pre-coding remains an algorithm that is very difficult to put into place because of the computation power required.

Thus, sub-optimal solutions of linear pre-coders with low complexity have appeared.

One category of linear pre-coders makes use of so-called linear non-iterative algorithms also referred to as "direct" or "closed form" (CF) algorithms. For each stream, these algorithms determine a send and receive vector pair. The pairs of vectors relating to all of the users are calculated by the base station. The base station informs the users of their receive vectors, typically by using a signaling channel. The base station transmits the information of each stream while using the corresponding transmit vector. All of the streams are transmitted simultaneously. On reception, each receiver associated with a user makes use of the receive vector communicated by the base station to combine the signals received on the various antennas and extract the samples that correspond to the stream of the user.

Among such pre-coders, an SJNR pre-coder is a pre-coder that is based on maximizing the signal to jamming and noise ratio, which ratio is given by the following expression:

$$SJNR_k = \frac{T_k^H H_k^H H_k T_k}{T_k^H \sum_{h=1,j\neq k}^{K} H_j^H H_j T_k + N_0 I} \qquad (1.1)$$

By way of example, article [1] discloses a method based on a pre-coder defined as the generalized eigen value of the expression for SJNR.

According to that article, the SJNR pre-coder for user k is determined by the following equation:

$$T_k = \sqrt{P_k}\, \zeta_m\!\left(\!\left(\sum_{j=1,j\neq k}^{K} H_j^H H_j + \frac{N_0}{P_k} I\right)^{-1} H_k^H H_k\right) \qquad (1.2)$$

with $$\sum_{k=1}^{K} P_k = P_T$$

where $P_k$ is the power transmitted to the user k and $\zeta_m[x]$ is the function that returns the greatest eigen value of x, i.e. $\zeta_m[x]$ is the eigen vector corresponding to the greatest eigen value of x. For the receiver, the authors of [1] propose a simple matched filter (MF) receiver having the following expression:

$$D_{MF,k} = \frac{(H_k T_k)^H}{\|(H_k T_k)\|} \qquad (1.7)$$

An iterative version of that pre-coder is described in [6] and the corresponding expression for the pre-coder is expressed in the form:

$$T_k^{iter} = \sqrt{P_k}\, \zeta_m\!\left(\!\left(\sum_{j=1,j\neq k}^{K} (H_j^{iter})^H (H_j^{iter}) + \frac{N_0^{iter}}{P_k} I\right)^{-1} (H_k^{iter})^H H_k^{iter}\right) \qquad (1.3)$$

In this expression (1.3), $N_0^{iter}$ represents the noise level perceived on reception by user k at iteration iter. $N_0^{iter}$ is given by the expression:

$$N_0^{iter} = N_0 D_k^{iter} (D_k^{iter})^H$$

with $D_k^{iter}$ being the receiver under consideration of the user k. In [6] the proposed receiver is an MSR receiver having the following expression:

$$D_{MSR,k} = \left(\zeta_m\!\left(\!\left(\sum_{j=1,j\neq k}^{K} H_k T_j R_{s_j} T_j^H H_k^H + N_0 I\right)^{-1} H_k T_k R_{s_k} T_k^H H_k^H\right)\right)^H \qquad (1.8)$$

Analyzing the performance of the system comprising the transmitter and the receiver is based on the value for the total data rate of the system. The expression for the total data rate or "sum-rate" (SR) is given by information theory as the sum of the data rates offered to the various users:

$$SR = \sum_{k=1}^{K} \log_2\!\left(1 + \frac{D_k H_k T_k R_{s_k} T_k^H H_k^H D_k^H}{D_k (\gamma_k + N_0 I) D_k^H}\right) \qquad (1.10)$$

where the term $$\gamma_k = H_k \sum_{j=1,j\neq k}^{K} T_j R_{s_j} T_j^H H_k^H$$

represents the interference generated by the other users and picked up by the user k.

The system described in [6] does indeed enable data rates to be maximized, but the algorithm converges towards a local maximum that depends on how the algorithm is initialized. Consequently, system optimization is not optimum when the local maximum is not a greatest maximorum.

SUMMARY

An embodiment of the invention proposes a transmission technique and a reception technique for a multi-user MIMO system making it possible to improve the known technique of system optimization so as to obtain better maximization of the transmission capacity of the system. The multi-user MIMO system comprises $N_T$ transmit antennas and $$N_R = \sum_{k=1}^{K} N_{R_k}$$

receive antennas associated with K receivers respectively associated with K users. The MIMO system comprises a transmitter that implements a method of simultaneously transmitting K data streams allocated respectively to K different users in accordance with an embodiment of the invention.

The transmission method of an embodiment of the invention is particularly remarkable in that it comprises, per data stream, at least:
 two different iterative algorithms in succession for jointly calculating a linear pre-coder and a receiver adapted for a multi-user MIMO system, the second iterative algorithm being initialized with the output value from the first iterative algorithm.

The iterative algorithms do not all have the same features. Unexpectedly, the inventors have observed that cascading two iterative algorithms of different types makes it possible to improve the total data rate that can be achieved in comparison with that which is achieved with a single iterative algorithm, but without thereby increasing the overall number of iterations. This cascade has the feature of reducing the impact of local maximums on the convergence process, and consequently of increasing the convergence of the second iterative algorithm on an absolute maximum. The initialization value for the second algorithm is obtained at the end of one or more iterations of the first iterative algorithm instead of being obtained arbitrarily. Thus, the initialization value is determined while taking account of the operating conditions of the MIMO system (transmission channel, noise (SNR), number of antennas), unlike an arbitrary choice.

The changeover from the first algorithm to the second algorithm takes place dynamically on the basis of an exit test based on a threshold for data rate variation that is reached in a given window of iterations. Alternatively, a maximum number of iterations may be set. This test ensures that the values of the initial vectors used by the second algorithm take sufficient account of variations in operating conditions; the number of iterations of the first algorithm therefore varies as a function of such operating conditions.

Typically, the first iterative algorithm is selected as presenting non-stable variation in the total data rate, and the second algorithm is selected as presenting variation in the total data rate that is strictly increasing.

More particularly, the first algorithm and the second algorithm take account of a first type of linear pre-coding known as SJNR that serves to maximize the signal to jamming and noise ratio or a second type of linear pre-coding known as MMSE that minimizes mean quadratic error.

More particularly, the first algorithm takes account of a first type of receiver known as an MF type receiver and the second algorithm takes account of a second type of receiver known as an MSR type receiver.

In a preferred implementation, the first algorithm and the second algorithm take account of a first type of linear pre-coding known as SJNR and the first algorithm takes account of a first type of receiver known as an MF type receiver and the second algorithm takes account of a second type of receiver known as an MSR type receiver.

An embodiment of the invention may also be expressed in more detailed form as a method of simultaneously transmitting K data streams allocated respectively to K different users, implemented by a transmitter for a multi-user MIMO system having $N_T$ transmit antennas and $$N_R = \sum_{k=1}^{K} N_{R_k}$$

receive antennas associated with K receivers respectively associated with K users, the method being characterized in that it comprises per data stream, at least:
 iteratively calculating jointly a first linear pre-coding transmit vector and a first receive vector $D_k^1$ associated with a first type of receiver, with an exit test for the iterative calculation based on a threshold for data rate variation reached in a given window of iterations or based on a maximum number of iterations; and
 iteratively calculating jointly a second linear pre-coding transmit vector $T_k^2$ and a second receive vector $D_k^2$ associated with a second type of receiver different from the first type, and initialized with the first receive vector, using an exit test for the iterative calculation based on a threshold for data rate variation between successive iterations or based on a maximum number of iterations; and in that it comprises:
 transmitting the K second receive vectors $D_k^2$ to the K receivers receiving the K streams; and
 transmitting the K streams pre-coded respectively by the K second transmit vectors.

In a preferred implementation, the steps of the transmission method are determined by the instructions of a transmission program incorporated in an electronic circuit such as a chip, itself suitable for being arranged in an electronic device such as a transmitter. The transmission method of an embodiment of the invention may equally well be implemented when the program is loaded in a calculation member such as a processor or the equivalent with its operation then being controlled by executing the program.

An embodiment of the invention also provides a transmitter adapted for a multi-user MIMO telecommunications system having $N_T$ transmit antennas for connecting to the transmitter, $$N_R = \sum_{k=1}^{K} N_{R_k}$$

receive antennas, and K receivers associated respectively with K users and connected respectively to $N_{R_k}$ of the $$N_R = \sum_{k=1}^{K} N_{R_k}$$

receive antennas in order to transmit K data streams simultaneously allocated respectively to the K users. The transmitter comprises:
 K linear pre-coders of transmit vectors $T_k$ for generating K intermediate vectors of size $N_T$;
 per pre-coder, a calculation device (calculation means) adapted to calculate iteratively and jointly a first transmit vector of a linear pre-coding and a first receive vector $D_k^1$ of size $N_{R_k}$ associated with a first type of receiver, with an exit test for the iterative calculation based on a threshold for variation in the data rate achieved over a given window of iterations or based on a maximum number of iterations, and then for calculating iteratively and jointly a second transmit vector $T_k^2$ of the linear pre-coding and a second receive vector $D_k^2$ of size $N_{R_k}$ associated with a second type of receiver different from the first and initialized with the first receive vector, with an exit test for the iterative calculation based on a threshold for variation of data rate between successive iterations or based on a maximum number of iterations, the K transmit vectors of the K linear pre-coders being equal to the second transmit vector $T_k^2$;
 $N_T$ adders of the $N_T$ components of the K intermediate vectors for generating a vector for feeding the $N_T$ antennas; and
 device for transmitting the K second receive vectors $D_k^2$ to the K receivers.

An embodiment of the invention also provides a multi-user MIMO telecommunications system comprising a transmitter, $N_T$ transmit antennas connected to the transmitter, $$N_R = \sum_{k=1}^{K} N_{R_k}$$

receive antennas, and K receivers associated respectively with K users and connected respectively to $N_{R_k}$ of the $$N_R = \sum_{k=1}^{K} N_{R_k}$$

receive antennas. The transmitter comprises:
- K linear pre-coders of transmit vectors $T_k$ for generating K intermediate vectors of size $N_T$;
- per pre-coder, a calculation device (calculation means) (CALCOD) adapted to calculate iteratively and jointly a first transmit vector of a linear pre-coding and a first receive vector $D_k^1$ of size $N_{R_k}$ associated with a first type of receiver, with an exit test for the iterative calculation based on a threshold for variation in the data rate achieved over a given window of iterations or based on a maximum number of iterations, and then for calculating iteratively and jointly a second transmit vector $T_k^2$ of the linear pre-coding and a second receive vector $D_k^2$ of size $N_{R_k}$ associated with a second type of receiver different from the first and initialized with the first receive vector, with an exit test for the iterative calculation based on a threshold for variation of data rate between successive iterations or based on a maximum number of iterations, the K transmit vectors of the K linear pre-coders being equal to the second transmit vector $T_k^2$;
- $N_T$ adders of the $N_T$ components of the K intermediate vectors for generating a vector for feeding the $N_T$ antennas; and
- a device for transmitting the K second receive vectors $D_k^2$ to the K receivers.

And each receiver k comprises:
- a receiver for receiving the receive vector $D_k^2$, which maximizes the data rate of the stream k; and
- a linear decoder adapted to extract the stream k from the K streams by the receive vector $D_k^2$, a device for estimating the matrix $H_k$ of the propagation channel. And the system comprises, associated with each receiver k:
- a device for transmitting the matrix $H_k$ to the transmitter.

Consequently, an embodiment of the invention also applies to a computer program, in particular a computer program on or in a data medium and adapted to implementing the an embodiment of. The program may use any programming language, and it may be in the form of source code, object code, or code intermediate between source code and object code such as in a partially compiled form, or in any other desirable form for implementing a method of an embodiment of the invention.

The data medium may be any entity or device capable of storing the program. For example, the medium may comprise storage means such as a read-only memory (ROM), e.g. a compact disk (CD) ROM or a microelectronic circuit ROM, or indeed magnetic recording means, e.g. a floppy disk or a hard disk.

Alternatively, the data medium may be an integrated circuit in which the program is incorporated, the circuit being adapted to execute or to be used in the execution of the program in question.

The program may also be converted into a transmissible form such as an electrical or optical signal, suitable for being conveyed by an electrical or optical cable or by radio or by other means. The program of an embodiment of the invention may in particular be downloaded from an Internet type network.

BRIEF DESCRIPTION OF THE DRAWINGS

Other characteristics and advantages appear from the following description of examples given by way of non-limiting example, which description is given with reference to the following accompanying figures.

DETAILED DESCRIPTION OF ILLUSTRATIVE EMBODIMENTS

The scheme of FIG. 1 represents a multi-user linear MIMO system of the prior art. The system SYS comprises a transmitter with a pre-coder PRECOD made up of K pre-coders, at the base station end, and K receivers at the user ends, all of which are linear in structure. The transmitter is connected to $N_T$ transmit antennas. The receiver of user k is connected to $N_{R_k}$ receive antennas. The broadcast channel from the transmitter to the receivers is represented by K transmission channels of matrix $H_k$.

Figure 2:
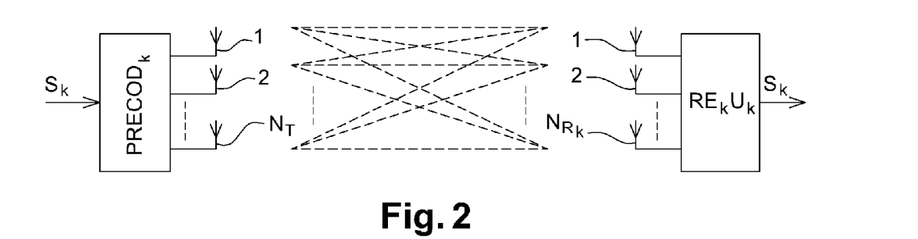
FIG. 2 is a diagram of the FIG. 1 MIMO system restricted to processing the stream k.

The scheme of FIG. 2 represents the FIG. 1 MIMO system limited to processing the stream k. The data $S_k$ of the stream k is combined with the transmit vector $T_k$ during the pre-coding implemented by the pre-coder $PRECOD_k$. The transmit vector $T_k$ is calculated using a method known in the prior art, e.g. a method based on an MMSE criterion or on an SJNR criterion.

Figure 3:
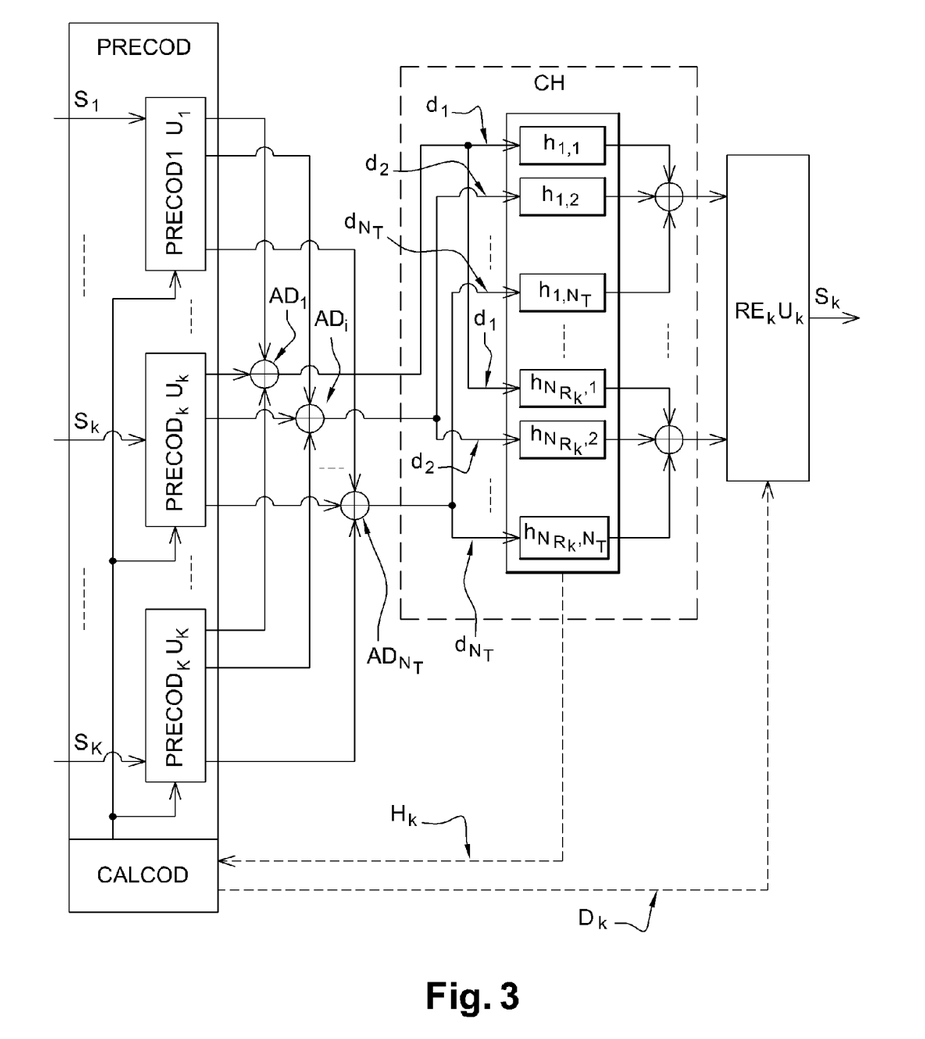
FIG. 3 is a detailed diagram of the pre-coding of the K data streams $S_1, \ldots, S_K$ of an embodiment of the invention.

FIG. 3 is a detailed diagram of the pre-coding of the K data streams $S_1, \ldots, S_K$. The pre-coder PRECOD is made up of K pre-coders $PRECOD_1, \ldots, _K$. The $N_T$ components of the output vectors from the pre-coders, known as "intermediate" vectors are added by $N_T$ adders $AD_1, \ldots, N_T$. The output vector $d_1, \ldots, d_{N_T}$ from the adders correspond to the signal transmitted over the propagation channel, and the $N_T$ transmit antennas are not shown. The propagation channel CH is represented by its matrix H. The receiver $RE_k$ of user k uses $N_{R_k}$ signals received by $N_{R_k}$ receive antennas (not shown). The signal received by an antenna i comes from the $N_T$ transmit antennas and is therefore equal to the transmitted signal $d_1, \ldots, d_{N_T}$ weighted by the channel coefficients $h_{i,1}, \ldots, h_{i,N_T}$.

The pre-coder comprises a module CALCOD for calculating the transmit and receive vectors for the K streams on the basis of the knowledge of the coefficients $H_k$ of the propagation channel for each stream k.

Unlike known techniques that determine the initial transmit and receive vectors separately, the calculation module CALCOD of an embodiment of the invention is adapted to determine these initial vectors jointly while implementing a first multi-user iterative algorithm for a MIMO system that takes account of the general expression for the total data rate of the multi-user MIMO system SYS so as to maximize the total data rate transferred over the channel CH. After one or more iterations, the calculation module CALCOD switches from the first iterative algorithm to the second iterative algorithm and uses the vectors calculated by the first iterative algorithm to initialize the values of the vectors of the second algorithm.

This changeover or "flip" point between algorithms is crucial for convergence. Changing from a receiver of a first type to a receiver of a second type too soon can lead to poor initialization that cannot be corrected by the receiver of the second type, and changing receiver too late can make it impossible to benefit from the advantages presented by a receiver of the second type. A decision to change over is taken in dynamic manner, thereby making it possible to take account of the variation in the optimum value for the changeover value as a function of the implementation of the channel, the SNR of the system, and the configuration used (the numbers of transmit and receive antennas).

Table 1 (shown below) relates to a system having $N_T=4$, $N_R=4, K=4$ with one stream per user for a configuration of the system corresponding to different total transmit powers respectively of $-10$ decibels (dB) and of 40 dB. Table 1 gives the optimum value for the changeover point as a function of the power that varies in steps of 2.5 dB. The first row corresponds to maximizing the mean total sum data rate over all implementations of the transmission channels and the second row corresponds to maximizing the sum of the data rates for each implementation of the K transmission channels for the K users.

These experimental results show strong dependency on the optimum changeover value as a function of the SNR value for operation of the system and also as a function of the transmission channel implementations, where the SNR is the ratio of the transmit power divided by the number of transmit antennas and the noise power is considered as being equal to one.

According to an embodiment of the invention, the changeover from the first algorithm to the second algorithm takes place using a decision-taking method based on a stop criterion. This decision-taking method consists in observing how the first algorithm varies while it is being executed in a moving window of predetermined size $WIN_{MF}$. This first algorithm is executed until it converges. Convergence is determined by the value for the total data rate SR stabilizing in the observation window. Once this first iterative algorithm has stabilized, and has thus converged, the calculation module CALCOD switches over to the second algorithm, taking the convergence point as the initialization point (defined by the (transmit, receive) pair of initialization vectors) and it executes the second algorithm. In fact, initializing the second algorithm does not require knowledge of the receive vector. The end of the algorithm is defined either by a maximum number of iterations $N_{max}^{iter}$ or by the total data rate SR of the system as evaluated between successive iterations becoming stabilized.

In a preferred implementation of the method, the first iterative algorithm associates an SJNR pre-coder and an MF receiver, and the second algorithm associates an SJNR pre-coder and an MSR receiver. The method takes place as follows for each stream $k=1, \ldots, K$:

0) initialize the parameters $N_{max}^{iter}$ (maximum total number of iterations), $WIN_{MF}$ (observation window) $\epsilon$, $\epsilon_{MF}$ and $\Delta_{MSR}$ (minimum number of iterations of the second algorithm, $\Delta_{MSR} \in \ast$ and $1 \leq \Delta_{MSR} \leq N_{max}^{iter} - WIN_{MF}$);

1) execute:
   calculate a linear SJNR pre-coder $T_k^0$ using formula (1.2);
   calculate an MF receiver $D_k^0 = D_{MF,k}$ using formula (1.7); and
   iter=1;

2) replace the transmission channel $H_k$ by an equivalent virtual channel given by cascading the channel and the receiver, written $H_k^{iter} = D_k^{iter-1} H_k$;

3) calculate the new SJNR pre-coder $T_k^{iter}$ with the new channel as obtained in this way by using equation (1.3);

4) calculate the new MF receiver $D_k^{iter} D_{MF,k}$ as a function of $T_k^{iter}$ using equation (1.7);

5) calculate the sum of the data rates $SR^{iter}$ obtained by injecting $T_k^{iter}$ and $D^{kiter}$ into equation (1.10);

6) increment iter=iter+1 and repeat steps 2) to 5) $WIN_{MF}$ times;

7) verify the convergence of the MF algorithm by verifying the following constraint:

$$\mathrm{Var}([SR_{iter-WIN_{MF}}, \ldots, SR_{iter}]) = $$

$$\frac{1}{WIN_{MF}} \sum_{i=0}^{WIN_{MF}} \left( SR_{iter-i} - \frac{1}{WIN_{MF}} \sum_{i=0}^{WIN_{MF}} SR_{iter-i} \right)^2 \leq \varepsilon_{MF}$$

If the condition is true or if iter=$N_{max}^{iter} - \Delta_{MSR}$, then move on to 8) while conserving the resulting vector $D_k^{iter}$. Else increment iter=iter+1 and repeat steps 2), 3), 4), 5), and 7);

8) increment the counter (iter=iter+1) and replace the transmission channel $H_k$ by an equivalent virtual channel given by cascading the channel and the receiver, written $H_k^{iter} D_k^{iter-1} H_k$;

(during first execution of 8) (i.e. on coming from 7)), $D^{kiter-1}$ is an MF receiver as calculated in 4) during iteration iter-1);

9) calculate the new SJNR pre-coder $T_k^{iter}$ with the new channel as obtained in this way by using equation (1.3);

10) calculate the new optimum receiver $D_k^{iter} = D_{MSR,k}$ as a function of $T_k^{iter}$ using equation (1.8) for an MSR receiver;

11) calculate the sum of the data rates, $SR^{iter}$, obtained by injecting $T_k^{iter}$ and $D_k^{iter}$ into equation (1.10); and 12) repeat steps 8) to 11) until the iterative algorithm converges. Convergence is determined by the value for the total data rate stabilizing $|SR^{iter} - SR^{iter+1}| < \epsilon$; or by exceeding a maximum number of iterations $N_{max}^{iter}$.

As an alternative to an SJNR pre-coder, it is possible to use an MMSE pre-coder. In [5], the authors describe a method based on an MMSE transmitter for each user that takes account of the interference generated by all of the other users. For each user, the form of the pre-coder is initially deduced using the following equation:

$$T_k = \sqrt{\frac{P_T}{\mathrm{tr}\left( \sum_{j=1}^{K} \hat{T}_j V_j^{(1)} (\hat{T}_j V_j^{(1)})^H \right)}} \hat{T}_k V_k^{(1)} \quad (1.4)$$

where $H_k \hat{T}_k = U_k \Sigma_k V_k^H$ and [ ]* is the conjugation operator, giving:

$$\hat{T}_k = \left( [H_1^T \ldots H_{k-1}^T H_{k+1}^T \ldots H_K^T]^* [H_1^T \ldots H_{k-1}^T H_{k+1}^T \ldots H_K^T]^T + \frac{N_{R_k}}{P_T} N_0 I \right)^{-1} \times \hat{H}_k^H$$

$$\hat{H}_k = \begin{bmatrix} H_k \\ [H_1^T \ldots H_{k-1}^T H_{k+1}^T \ldots H_K^T]^T \end{bmatrix}$$

An iterative form of this type of MMSE pre-coder is proposed in [2]. The method described is an iterative linear solution based on MMSE transmitters and receivers. The transmitter is given by the following equation:

$$T'_k = \left( \sum_{i=1}^{K} (H_i^{iter})^H (D_i^{iter})^H D_i^{iter} H_i^{iter} + \frac{N_0}{P_T} \sum_{j=1}^{K} tr(D_j^H (D_j^{iter})^H) I \right)^{-1} (H_k^{iter})^H (D_k^{iter})^H \quad (1.5)$$

In this alternative, the method uses the formulae (1.4) and (1.5) instead of the formulae (1.2) and (1.3).

As an alternative to an SJNR pre-coder or following on thereafter, it is possible to use a Stojnic, Vikalo, Hassibi (SVH) pre-coder, but only for a MISO system.

An SVH pre-coder is calculated on the basis of mathematical analysis that makes it possible to maximize the total data rate SR of the system by calculating exact derivatives of the Lagrangian. An iterative approach implementing that maximization method is described in [7]. Reference [7] defines the following system of equations:

$$\begin{cases} T^{iterSVH} = ((\sigma^2 tr(F^{iterSVH-1}))I + H^H F^{iterSVH-1} H)^{-1} H^H G^{iterSVH-1} & (1.6) \\ num_k = |(HT^{iterSVH})_{kk}|^2; \\ den_k = \sigma^2 tr(T^{iterSVH}(T^{iterSVH})^H) + \sum_{n=1, n \neq k}^{K} |(HT^{iterSVH})_{kn}|^2 \\ F^{iterSVH} = diag\left( \frac{num_1}{den_1(den_1 + num_1)}, \ldots, \frac{num_1}{den_K(den_K + num_K)} \right) \\ G^{iterSVH} = diag\left( \frac{(HT^{iterSVH-1})_{11}}{den_1}, \ldots, \frac{(HT^{iterSVH-1})_{KK}}{den_K} \right) \end{cases}$$

where $H = [(H_1^{iter})^T, \ldots, (H_k^{iter})^T]^T$. This algorithm requires initialization that consists in setting the initial matrices F and G equal to I.

In this alternative, the method uses formula (1.6) instead of formulae (1.2) and (1.3).

When use takes place in successive manner, then the method also includes the following, per data stream:

calculating iteratively and jointly a third transmit vector of the linear pre-coding associated with a second transmitter type, typically of the SVH type calculated using formula (1.6), and different from the first type, and a third receive vector $D_k^3$ associated with the second type of receiver, initialized with the second receive vector, with an exit test for the iterative calculation that is based on a threshold for variation of data rate between successive iterations or based on a maximum number of iterations; and only the K third transmit vectors are used for pre-coding, the transmission of the K receive vectors relying on the K third receive vectors $D_k^3$.

As an alternative to an MSR receiver given by equation (1.8), it is possible to use an MMSE receiver given by the following equation:

$$D_k = T_k^H H_k^H \left( H_k \left( \sum_{i=1}^{K} T_i T_i^H \right) H_k^H + N_0 I \right)^{-1} \quad (1.9)$$

The following examples serve to illustrate a method of exemplary embodiments of the invention.

The first example relates to a multi-user MIMO system comprising firstly a base station with $N_T=4$ transmit antennas and secondly four receivers respectively associated with K=4 users each having $N_{R_k}=4$ receive antennas. The simulations take account of Rayleigh channels that are completely decorrelated between the K users. The values used for the parameters are the following: $WIN_{MF}=5$, $\epsilon=10^{-3}$, $\Delta_{MSR}=5$ and $\epsilon_{MF}=10^{-3}$. The only stop condition used consists in setting the total number of iterations $N_{max}^{iter}$ to 50. Performance was thus obtained without introducing any additional complexity compared with the mono-iterative algorithm described in [6].

Figure 4:
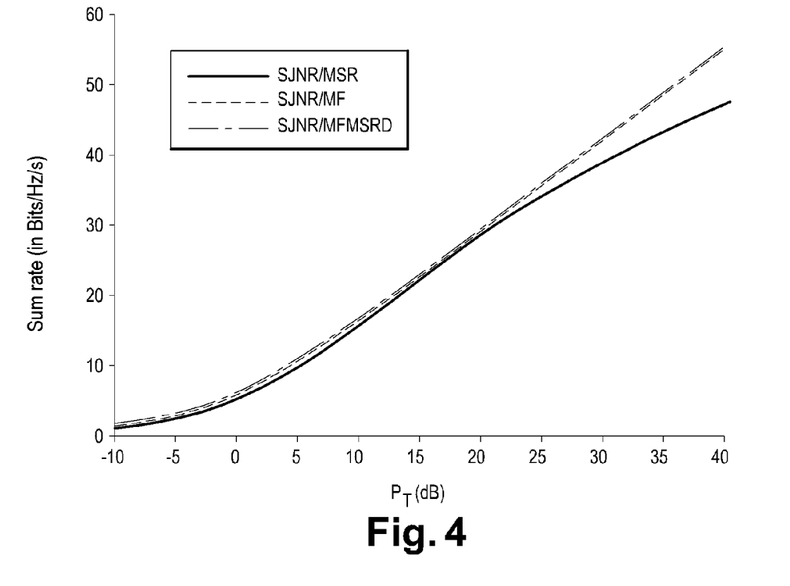
FIG. 4 is in the form of curves showing the results of simulations giving an average total data rate achieved on the transmission channel implementations as a function of the total transmitted power level, which has a direct impact on reception on the signal-to-noise ratio, in a first example of a multi-user MIMO system implementing three different algorithms.
Figure 5:
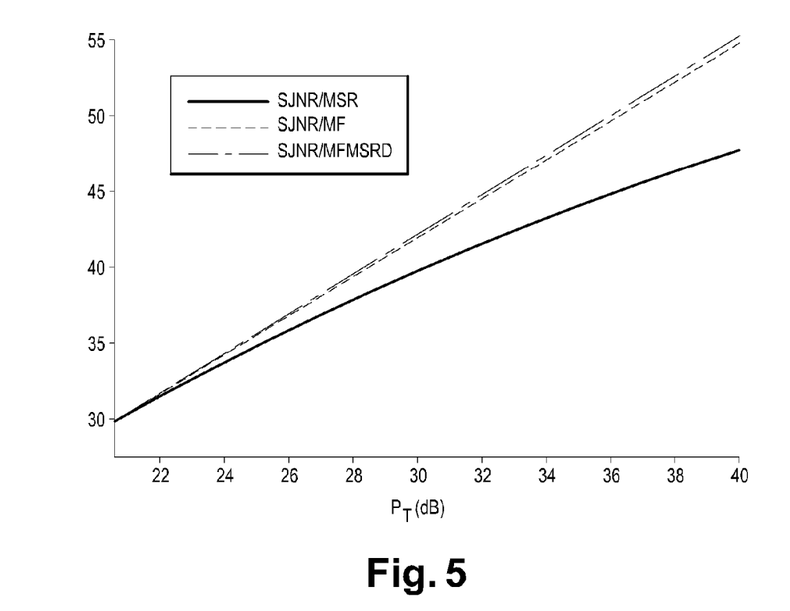
FIGS. 5 and 6 show magnifications of FIG. 4.
Figure 6:
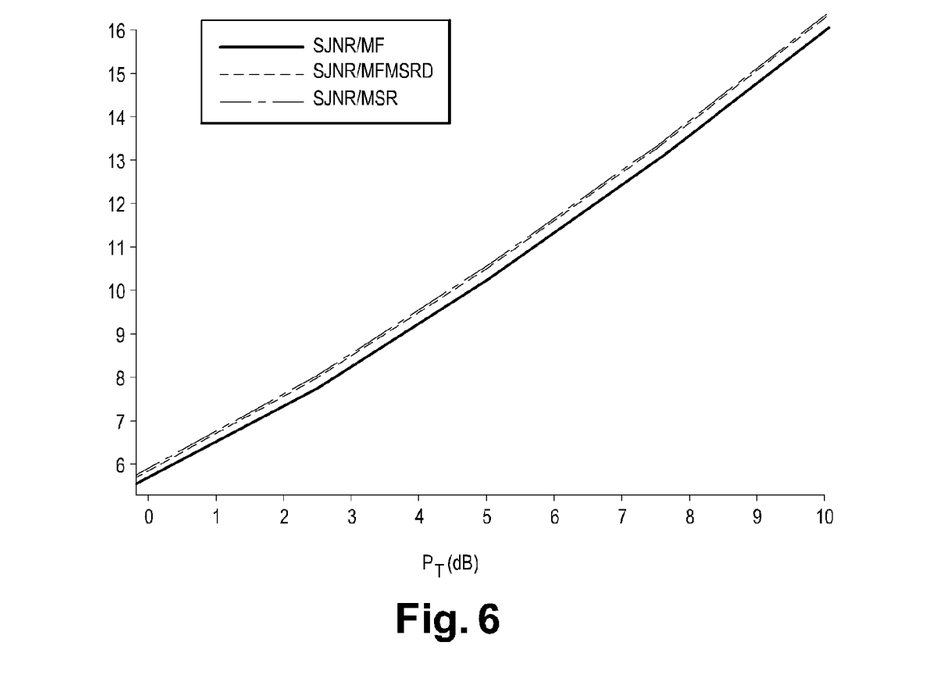

The curve SJNR/MFMSRD for the total data rate of the system as a function of total transmitted power, as obtained with an algorithm of an embodiment of the invention, is shown in FIG. 4 and in FIGS. 5 and 6, which are respective magnifications of FIG. 4. These figures show the total data rate values obtained respectively with an algorithm having an SJNR pre-coder and an MF receiver derived from reference [6], given by curve SJNR/MF, and an algorithm with an SJNR pre-coder and an MSR receiver as described in reference [6], curve SJNR/MSR.

Comparing the curve SJNR/MFMSRD with the curves SJNR/MF and SJNR/MSR reveals an improvement of the order of 0.5 bits per second per hertz (bits/s/Hz) compared with the high SNR SJNR/MF solution, with reference to FIG. 5, without suffering from poor performance of the latter algorithm with low SNR. The curves of FIG. 6 also show an improvement, even if a smaller improvement, compared with the best algorithm, i.e. SJNR/MSR.

Figure 7:
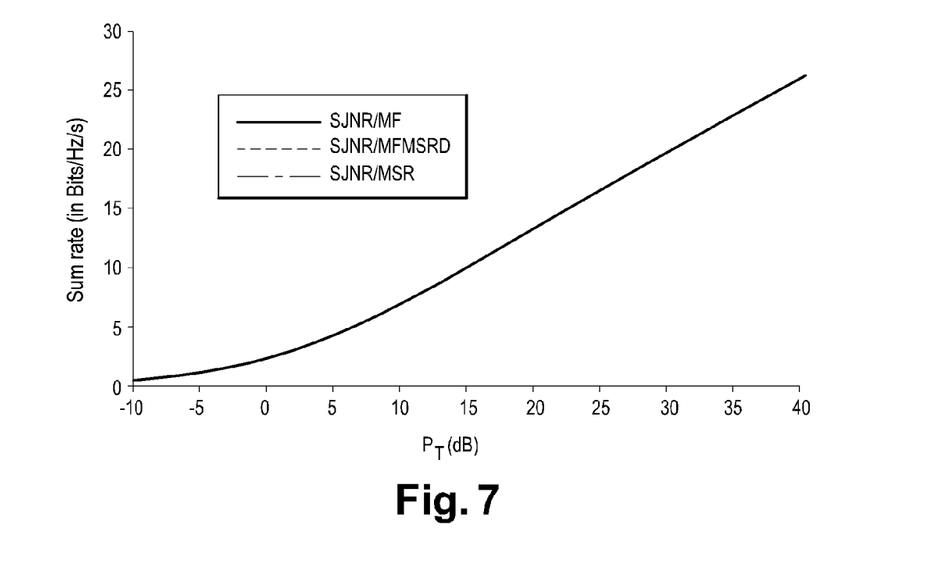
FIG. 7 shows curves for the results of simulations giving mean total data rate as a function of total transmitted power level, which has a direct impact on reception on the signal-to-noise ratio, for a second example of a multi-user MIMO system implementing three different algorithms.
Figure 8:
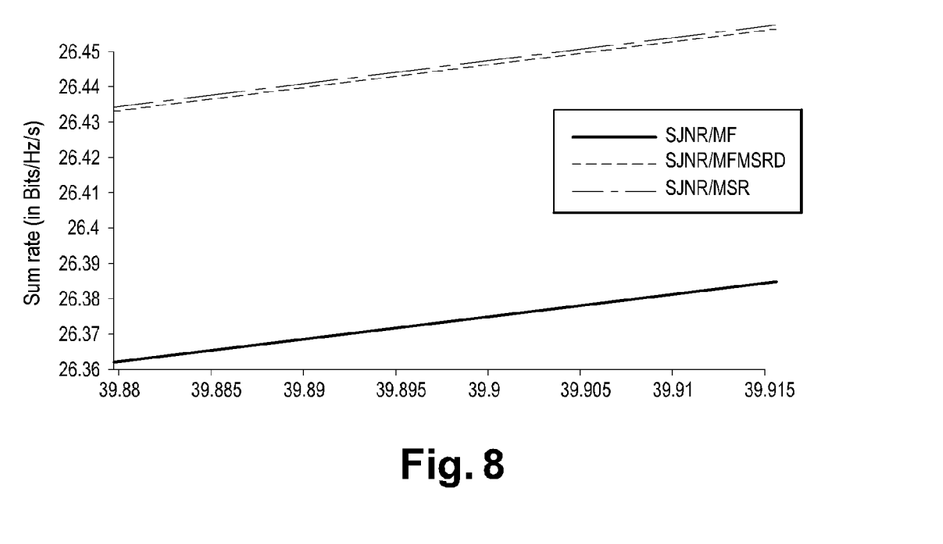
FIG. 8 is a magnification of FIG. 7.

The second example relates to a multi-user MIMO system comprising firstly a base station with $N_T=2$ transmit antennas and secondly two receivers associated respectively with K=2 users each having $N_{R_k}=2$ receive antennas. The simulation conditions are the same as in the first example. The results shown are given in FIGS. 7 and 8, where FIG. 8 is a magnification of FIG. 7. The curves SJNR/MFMSRD, SNJR/MF, and SJNR/MSR relate respectively to the same algorithms as in FIG. 4. Comparing the curve SJNR/MFMSRD with the curves SJNR/MF and SJNR/MSR reveals an improvement, with reference to FIG. 8.

TABLE 1

| | \multicolumn{11}{c}{$P_{total}$ (dB)} |
|---|---|---|---|---|---|---|---|---|---|---|---|
| | −10 | −7.5 | −5 | −2.5 | 0 | 2.5 | 5 | 7.5 | 10 | 12.5 | 15 |
| $N_{flip}$ opt max $SR_{mean}$ | 1 | 1 | 1 | 1 | 1 | 9 | 14 | 22 | 19 | 29 | 12 |
| $N_{flip}$ mean max SR | 30.52 | 30.09 | 28.93 | 29.80 | 29.46 | 31.21 | 34.44 | 40.77 | 46.88 | 46.99 | 44.06 |

| | \multicolumn{10}{c}{$P_{total}$ (dB)} |
|---|---|---|---|---|---|---|---|---|---|---|
| | 17.5 | 20 | 22.5 | 25 | 27.5 | 30 | 32.5 | 35 | 37.5 | 40 |
| $N_{flip}$ opt max $SR_{mean}$ | 16 | 22 | 25 | 26 | 32 | 45 | 48 | 47 | 47 | 48 |
| $N_{flip}$ mean max SR | 40.66 | 42.16 | 45.76 | 42.96 | 37.57 | 33.02 | 28.93 | 26.15 | 24.02 | 22.49 |

REFERENCES

[1] Yongle Wu, Jinfan Zhang, Mingguang Xu, Shidong Zhou and Xibin Xu, "Multiuser MIMO Downlink Precoder Design Based on the Maximal SJNR Criterion", IEEE GLOBECOM 2005 proceedings, pp. 2694-2698.

[2] H. Wang, X. Xu, M. Zhao, W. Wu, and Y. Yao, "Robust Transmission for Multiuser MIMO Downlink Systems with Imperfect CSIT", IEEE WCNC 2008, pp. 340-344.

[3] M. Costa, "Writing on Dirty Paper", IEEE Trans. Inf. Theory, vol. 29, no. 3, pp. 439-441, May 1983.

[4] G. Caire and S. Shamai, "On the achievable throughput of a multiantenna Gaussian broadcast channel", IEEE Trans. Inform. Theory, vol. 49, no. 7, pp. 1691-1706, July 2003.

[5] M. Lee and S. K. Oh, "A Per-User Successive MMSE Precoding Technique in Multiuser MIMO Systems", IEEE Vehicular Technology Conference (VTC2007-Spring), pp. 2374-2378, 22-25 Apr. 2007.

[6] M. Amara, Y. Yuan-Wu and D. Slock, "Receiver and Transmitter Iterative Optimization Using Maximum Sum-Rate Criterion for Multi-User MIMO Systems", ISCCSP 2010.

[7] M. Stojnic, H. Vikalo, and B. Hassibi, "Rate maximization in multi-antenna broadcast channels with linear preprocessing", 2004. GLOBECOM '04. IEEE.

Although the present disclosure has been described with reference to one or more examples, workers skilled in the art will recognize that changes may be made in form and detail without departing from the scope of the disclosure and/or the appended claims.

The invention claimed is:

1. A method comprising:
   simultaneously transmitting K data streams allocated respectively to K different users, by a transmitter for a multi-user MIMO system having $N_T$ transmit antennas and $$N_R = \sum_{k=1}^{K} N_{R_k}$$

receive antennas associated with K receivers associated respectively with K users, wherein the step of transmitting comprises per data stream, at least:
   jointly calculating a linear pre-coder and a receiver adapted for a multi-user MIMO system, using first and second different iterative algorithms in succession performed at least in part by an electronic circuit, the second iterative algorithm being initialized with an output value from the first iterative algorithm, wherein the first iterative algorithm is adapted for a matched filter (MF) type receiver, and the second algorithm is adapted for a maximum sum rate(MSR) type receiver.

2. The method according to claim 1, wherein the first iterative algorithm is adapted for a first type of receiver presenting non-stable variation of the total data rate, and the second algorithm is adapted for a second type of receiver presenting strictly increasing variation for the total data rate.

3. The method according to claim 1, wherein the linear pre-coder implements an algorithm of a type belonging to the following list:
   SJNR, which maximizes the signal to jamming and noise ratio; and
   MMSE, which minimizes the mean square error.

4. A method comprising:
   simultaneously transmitting K data streams allocated respectively to K different users, implemented by a transmitter for a multi-user MIMO system having $N_T$ transmit antennas and $$N_R = \sum_{k=1}^{K} N_{R_k}$$

receive antennas associated with K receivers respectively associated with K users, wherein the step of transmitting comprises:
   per data stream, at least:
      iteratively calculating jointly, using an electronic circuit, a first linear pre-coding transmit vector and a first receive vector $D_k^1$ associated with a first type of receiver, with an exit test for the iterative calculation based on a threshold for data rate variation reached in a given window of iterations or based on a maximum number of iterations; and
      iteratively calculating jointly a second linear pre-coding transmit vector $T_k^2$ and a second receive vector $D_k^2$ associated with a second type of receiver different from the first type, and initialized with the first receive vector, using an exit test for the iterative calculation based on a threshold for data rate variation between successive iterations or based on a maximum number of iterations;
      transmitting the K second receive vectors $D_k^2$ to the K receivers receiving the K streams; and transmitting the K streams pre-coded respectively by the K second transmit vectors.

5. The method according to claim 4, wherein the first receive vector $D_k^1$ is associated with matched filter (MF) type receive algorithm and wherein the second receive vector $D_k^2$ is associated with a maximum sum rate (MSR) type receive algorithm.

6. The method according to claim 4, wherein the first transmit vector and the second transmit vector are associated with a first type of transmitter, and further comprising per data stream:
calculating iteratively and jointly a third transmit vector of the linear pre-coding associated with a second type of transmitter different from the first type, and a third receive vector $D_k^3$ associated with the second type of receiver as initialized with the second receive vector, using an exit test for the iterative calculation based on a threshold for data rate variation between successive iterations or based on a maximum number of iterations; and wherein only the K third transmit vectors are used for pre-coding, the transmission of the K receive vectors relying on the K third receive vectors $D_k^3$.

7. The method according to claim 6, wherein the second transmitter type implements an algorithm belonging to the following list:
SJNR, which maximizes the signal to jamming and noise ratio;
MMSE, which minimizes the mean square error;
SVH, which optimizes total data rate.

8. A transmitter adapted for a multi-user MIMO telecommunications system having $N_T$ transmit antennas for connecting to the transmitter, $$N_R = \sum_{k=1}^{K} N_{R_k}$$

receive antennas, and K receivers associated respectively with K users and connected respectively to $N_{R_k}$ of the $$N_R = \sum_{k=1}^{K} N_{R_k}$$

receive antennas in order to transmit K data streams simultaneously allocated respectively to the K users, wherein the transmitter comprises:
K linear pre-coders of transmit vectors $T_k$ for generating K intermediate vectors of size $N_T$;
per pre-coder, a calculation device adapted to calculate iteratively and jointly a first transmit vector of a linear pre-coding and a first receive vector $D_k^1$ of size $N_{R_k}$ associated with a first type of receiver, with an exit test for the iterative calculation based on a threshold for variation in the data rate achieved over a given window of iterations or based on a maximum number of iterations, and then to calculate iteratively and jointly a second transmit vector $T_k^2$ of the linear pre-coding and a second receive vector $D_k^2$ of size $N_{R_k}$ associated with a second type of receiver different from the first and initialized with the first receive vector, with an exit test for the iterative calculation based on a threshold for variation of data rate between successive iterations or based on a maximum number of iterations, the K transmit vectors of the K linear pre-coders being equal to the second transmit vector $T_k^2$;
$N_T$ adders of the $N_T$ components of the K intermediate vectors for generating a vector for feeding the $N_T$ antennas; and
a device adapted to transmit the K second receive vectors $D_k^2$ to the K receivers.

9. The transmitter according to claim 8, wherein the first receive vector $D_k^1$ of size $N_{R_k}$ is associated with a matched filter (MF) type receiver and the second receive vector $D_k^2$ of size $N_{R_k}$ is associated with a maximum sum rate (MSR) receiver type.

10. A multi-user MIMO telecommunications system comprising:
a transmitter,
$N_T$ transmit antennas connected to the transmitter, $$N_R = \sum_{k=1}^{K} N_{R_k}$$

receive antennas, and
K receivers associated respectively with K users and connected respectively to $N_{R_k}$ of the $$N_R = \sum_{k=1}^{K} N_{R_k}$$

receive antennas, wherein:
the transmitter comprises:
K linear pre-coders of transmit vectors $T_k$ for generating K intermediate vectors of size $N_T$;
per pre-coder, a calculation device adapted to calculate iteratively and jointly a first transmit vector of a linear pre-coding and a first receive vector $D_k^1$ of size $N_{R_k}$ associated with a first type of receiver, with an exit test for the iterative calculation based on a threshold for variation in the data rate achieved over a given window of iterations or based on a maximum number of iterations, and then to calculate iteratively and jointly a second transmit vector $T_k^2$ of the linear pre-coding and a second receive vector $D_k^2$ of size $N_{R_k}$ associated with a second type of receiver different from the first and initialized with the first receive vector, with an exit test for the iterative calculation based on a threshold for variation of data rate between successive iterations or based on a maximum number of iterations, the K transmit vectors of the K linear pre-coders being equal to the second transmit vector $T_k^2$;
$N_T$ adders of the $N_T$ components of the K intermediate vectors for generating a vector for feeding the $N_T$ antennas; and
a device adapted to transmit the K second receive vectors $D_k^2$ to the K receivers,
wherein each receiver k comprises:
a receiver for receiving the receive vector $D_k^2$, which maximizes the data rate of the stream k; and
a linear decoder adapted to extract the stream k from the K streams by means of the receive vector $D_k^2$, an estimation device for estimating the matrix $H_k$ of the propagation channel, and comprises, associated with each receiver k:
a device adapted to transmit the matrix $H_k$ to the transmitter.

11. The multi-user MIMO telecommunications system according to claim 10, wherein the first receive vector $D_k^1$ of size $N_{R_k}$ is associated with a matched filter (MF) type receiver and the second receive vector $D_k^2$ of size $N_{R_k}$ is associated with maximum sum rate (MSR) type receiver.

12. A non-transitory computer-readable data medium comprising a computer program stored thereon, said program including program instructions adapted to implement a method of simultaneously transmitting K data streams allocated respectively to K different users, the method being implemented by a transmitter for a multi-user MIMO system having $N_T$ transmit antennas and $$N_R = \sum_{k=1}^{K} N_{R_k}$$

receive antennas associated with K receivers associated respectively with K users, when said instructions are executed at least in part by an electronic circuit in a transmitter, wherein the instructions comprise:
instructions configured to perform the following steps at least in part by the electronic circuit, per data stream:
jointly calculating a linear pre-coder and a receiver adapted for a multi-user MIMO system, using first and second different iterative algorithms in succession performed at least in part by an electronic circuit, the second iterative algorithm being initialized with an output value from the first iterative algorithm, wherein the first iterative algorithm is adapted for a matched filter (MF) type receiver, and the second algorithm is adapted for a maximum sum rate (MSR) type receiver.

13. The method according to claim 4, wherein the linear pre-coding implements an algorithm of a type belonging to the following list:
SJNR, which maximizes the signal to jamming and noise ratio; and
MMSE, which minimizes the mean square error.

* * * * *